(12) United States Patent
Shimamura et al.

(10) Patent No.: US 7,395,520 B2
(45) Date of Patent: Jul. 1, 2008

(54) LSI APPARATUS

(75) Inventors: Masami Shimamura, Hachioji (JP);
Takumi Soga, Sagamihara (JP)

(73) Assignee: Olympus Corporation, Tokyo (JP)

( * ) Notice: Subject to any disclaimer, the term of this patent is extended or adjusted under 35 U.S.C. 154(b) by 599 days.

(21) Appl. No.: 10/867,806

(22) Filed: Jun. 16, 2004

(65) Prior Publication Data
US 2004/0260713 A1   Dec. 23, 2004

(30) Foreign Application Priority Data
Jun. 18, 2003   (JP)   ............... 2003-172738

(51) Int. Cl.
*G06F 17/50* (2006.01)
*G06F 13/14* (2006.01)

(52) U.S. Cl. ............................ 716/14; 710/8

(58) Field of Classification Search ................ 710/305, 710/316, 8, 22; 716/1, 14–17, 5; 707/100; 713/100
See application file for complete search history.

(56) References Cited

U.S. PATENT DOCUMENTS 6,366,975 B1 *  4/2002  Nakajima ................. 710/305
6,501,300 B2 * 12/2002  Hatae ......................... 326/93
6,789,135 B1 *  9/2004  Yamamoto et al. ............ 710/8
7,076,745 B2 *  7/2006  Togo ........................... 716/1
2002/0026553 A1 *  2/2002  Saito ........................... 711/1

FOREIGN PATENT DOCUMENTS

JP         8-204128         8/1996

* cited by examiner

*Primary Examiner*—Hung T Vy
(74) *Attorney, Agent, or Firm*—Westerman, Hattori, Daniels & Adrian, LLP.

(57) ABSTRACT

Disclosed herein is an LSI apparatus having a CPU and a plurality of functional blocks for controlling an external equipment, the plurality of functional blocks sharing one external terminal connected to the external equipment, including: a mode register having a flag information set by the CPU indicating validity or invalidity of each functional block; a selector for switching the connection between each functional block and the external terminal; and a switch controller retaining a priority sequence among each functional block, for controlling switching of the selector based on the priority sequence and the flag information set at the mode register.

4 Claims, 9 Drawing Sheets

FIG. 2 PRIOR ART

| REGISTER SET VALUE BY CPU | LSI EXTERNAL TERMINAL CONNECTED TO: |
|---|---|
| 0 | IO PORT |
| 1 | FUNCTIONAL BLOCK 1 |
| 2 | FUNCTIONAL BLOCK 2 |
| ⋮ | ⋮ |
| N | FUNCTIONAL BLOCK N |

FIG. 4

| CPU ADDRESS | CPU DATA BUS | | BIT[0]=1 | BIT[0]=0 |
|---|---|---|---|---|
| | BIT[31:1] | BIT[0] | | |
| 00h | RESERVED | F1 | VALIDATE FUNCTIONAL BLOCK 1 | INVALIDATE FUNCTIONAL BLOCK 1 |
| 04h | RESERVED | F2 | VALIDATE FUNCTIONAL BLOCK 2 | INVALIDATE FUNCTIONAL BLOCK 2 |
| 08h | RESERVED | F3 | VALIDATE FUNCTIONAL BLOCK 3 | INVALIDATE FUNCTIONAL BLOCK 3 |
| ⋮ | | | ⋮ | ⋮ |
| xxh | RESERVED | FN | VALIDATE FUNCTIONAL BLOCK N | INVALIDATE FUNCTIONAL BLOCK N |

FIG. 5

| FUNCTIONAL BLOCK 1 | FUNCTIONAL BLOCK 2 | FUNCTIONAL BLOCK 3 | ... | FUNCTIONAL BLOCK N | BLOCK CONNECTED TO LSI EXTERNAL TERMINAL |
|---|---|---|---|---|---|
| 1 | X | X | X | X | FUNCTIONAL BLOCK 1 |
| 0 | 1 | X | X | X | FUNCTIONAL BLOCK 2 |
| 0 | 0 | 1 | X | X | FUNCTIONAL BLOCK 3 |
| ⋮ | ⋮ | ⋮ | ⋮ | ⋮ | ⋮ |
| 0 | 0 | 0 | 0 | 1 | FUNCTIONAL BLOCK N |

LSI APPARATUS

This application claims benefit of Japanese Patent Application No. 2003-172738 filed in Japan on Jun. 18, 2003, the contents of which are incorporated by this reference.

BACKGROUND OF THE INVENTION

The present invention relates to LSI (large scale integrated circuit) apparatus, and more particularly relates to so-called multifunctional type LSI apparatus in which an LSI external terminal is shared by a plurality of different functional blocks.

First among the prior-art techniques for controlling a multifunctional type LSI apparatus having a plurality of different functional blocks sharing an LSI external terminal is a technique as disclosed in Japanese Patent Application Laid-Open Hei-8-204128 in which a multiplexer for switching from one functional block to another is mounted so that control is effected with using a selecting signal of the multiplexer as an input signal.

Secondly, there is a technique for switching LSI external terminal as a unit based on a software. An example of this is a commercially available CPU (central processing unit) chip. Such CPU chip is provided with functional blocks such as DMA controller, interrupt controller, memory controller, and timer that are connected to a periphery of CPU module within the chip, and each functional block shares an LSI external terminal in the construction as shown in FIG. 1. This CPU chip is also provided with a functional block called GPIO (General Purpose Input Output) for each LSI external terminal. The function of this functional block is an IO port function through which CPU can monitor input signal values of LSI external terminal (input/output terminal in this case), determine the values to be outputted as output signal, and effect the involved switching of input/output direction.

A description will now be given with respect to the construction and control technique of the prior-art multifunctional type LSI apparatus shown in FIG. 1. The switching between the terminals of functional blocks 1, 2, ... N, terminal of IO port 106, and a bilateral buffer 103 of an LSI external terminal 120 connected to the external equipments, is effected as follows. In particular, the switching of the input direction is effected by an input switching selector 107, the output direction by an output switching selector 108, and the switching of enabling signal of input/output is effected by an enable switching selector 109. The output switching selector 108 and enable switching selector 109 each are a selector for effecting a simple switching connection. The circuit construction of the input switching selector 107, on the other hand, is to connect the input direction of the bilateral buffer 103 of LSI external terminal 120 to the terminal of one block selected from the functional blocks or IO port 106 and to fix other blocks to non-active level.

The switching enabling signals of each switching selector 107, 108 and 109 are generated at a switch controller 105. The switch controller 105 is provided with a register group at the interior of the controller, which are readable/writable by CPU 101, and it transmits switching enable signals to each switching selector 107, 108 and 109 based on the register value of such register. In such technique, for example as shown in FIG. 2, the connection of the external terminal 120 is switched to IO port when CPU 101 writes "0" to register of the switch controller 105. It is switched to functional block 1 when "1" is written and is switched to functional block N when "N" is written. It should be noted that numeral 102 in FIG. 1 denotes a switching device for switching the connection between the LSI external terminal 120 and the terminals of functional blocks 1, 2, ... N. It includes: the above described input switching selector 107; output switching selector 108; enable switching selector 109; and an LSI external terminal control block 104 consisting of the IO port 106 and switch controller 105.

SUMMARY OF THE INVENTION

It is an object of the present invention to provide an LSI apparatus in which the switch setting of an external terminal to functional blocks and IO port can be efficiently set while reducing a load on CPU.

In a first aspect of the invention, there is provided an LSI apparatus having a CPU and a plurality of functional blocks for controlling an external equipment, the plurality of functional blocks sharing one external terminal connected to the external equipment, including: a mode register having a flag information set by the CPU indicating validity or invalidity of each functional block; a selector for switching the connection between each functional block and the external terminal; and a switch controller retaining a priority sequence among each functional block, for controlling switching of the selector based on the priority sequence and the flag information set at the mode register.

In a second aspect of the invention, the LSI apparatus according to the first aspect further includes an IO means for effecting data communication between the CPU and the external terminal, the switch controller retaining the priority sequence among each functional block inclusive of the IO means.

In a third aspect of the invention, the IO means in the LSI apparatus according to the second aspect includes a change interrupt notification means for detecting a change in input value of the external terminal to notify the CPU of an interrupt.

In a fourth aspect of the invention, the IO means in the LSI apparatus according to the second aspect includes a timer interrupt notification means for notifying the CPU of an interrupt when an input value of the external terminal does not change before an elapse of set predetermined time.

BRIEF DESCRIPTION OF THE DRAWINGS

FIG. 2 shows correspondence between the register set values by CPU and each switching selector operation in the prior-art example shown in FIG. 1.

FIG. 4 explains an example of construction and control bits of the mode register group in the first embodiment shown in FIG. 3.

FIG. 5 is a truth table indicating the relationship between the mode register values of the mode register group and each control mode of the switching selector.

DESCRIPTION OF THE PREFERRED EMBODIMENTS

First Embodiment

Figure 3:
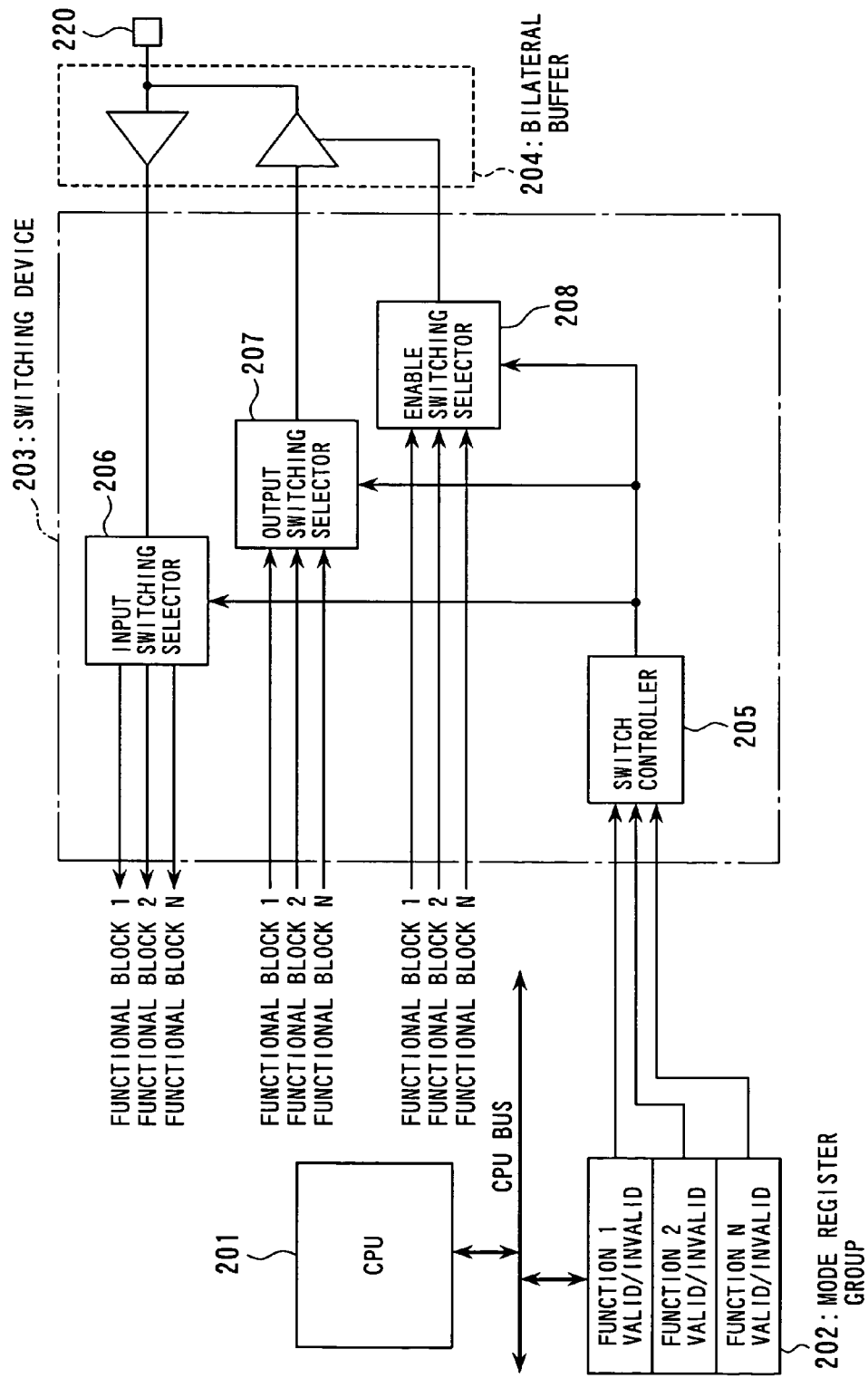
FIG. 3 is a block diagram showing a first embodiment of the LSI apparatus according to the invention.

Some embodiments of the invention will now be described. FIG. 3 is a block diagram showing construction of the multifunctional LSI apparatus according to a first embodiment of the invention. FIG. 3 includes: 201, CPU; 202, a mode register group integrally formed within the LSI apparatus to which valid/invalid modes of functional blocks 1, 2, . . . N for controlling an external equipment (not shown) are set by CPU 201; 220, an LSI external terminal connected to the external equipment; 203, a switch device for switching the connection between the LSI external terminal 220 and the terminals of the functional blocks 1, 2, . . . N; and 204, an input/output buffer of the external terminal 220 of LSI.

The switch device 203 includes: a switch controller 205 previously retaining a priority sequence among a plurality of functional blocks with respect to the connection with the LSI external terminal 220, for outputting switching enable signals correspondingly to such priority sequence and values at the mode register group 202; an input switching selector 206 for input direction and output switching selector 207 for output direction for switching the connection between the terminals of the functional blocks 1, 2, . . . N and the input/output buffer 204 based on an output value of the switch controller 205; and an enable switching selector 208 of the input/output buffer 204.

This embodiment is characterized in that the switch controller 205 retains a priority sequence and such priority sequence is used to control the input switching selector 206, output switching selector 207, and enable switching selector 208 correspondingly to the setting at the mode register group 202.

An operation of thus constructed first embodiment will now be described. CPU 201 first sets to the mode register group 202 as to which functional block is desired to be validated, i.e., which one of the functional blocks is to be used. FIG. 4 explains an example of construction and control bits of the mode register group 202. In the case of the example shown in FIG. 4, Bit [0] of the corresponding mode register is set to "1" for the functional block to be used.

The switch controller 205 then outputs a switch enabling signal to each of the switching selectors 206, 207 and 208 in accordance with the priority sequence and register values (flag information) of the mode register group 202.

FIG. 5 is a truth table indicating an example of mode register values of the mode register group 202 and a series of operation for connecting each functional block by controlling each switching selector 206, 207 and 208 through the switch controller 205 as a result of such register values of the register group. In the table, "1", "0", "X" indicate validity/invalidity of the mode registers, signifying validity by "1", invalidity by "0", and "Don't Care" by "X". In the case shown in FIG. 5, functional block 1 has the highest priority so that, even when the mode register value of a functional block other than the functional block 1 is set as valid, the LSI external terminal 220 is connected to the functional block 1. The priorities for the rest are set so as to be lowered along the order of functional blocks 2, . . . N. A possible conflict is thereby eliminated even when a plurality of functional blocks are set as valid.

By such construction, supposing for example there are terminals for each functional block, i.e., M units of LSI external terminal, the processing in the prior art requiring M times of switching by CPU, the same as the number of terminals, for each switching device can be achieved by simply setting the mode register of the pertinent block as valid at the mode register group 202. In other words, a load on the CPU can be reduced, since all of M terminals are switched in their connection by only once setting a mode register as "valid".

Second Embodiment

Figure 1:
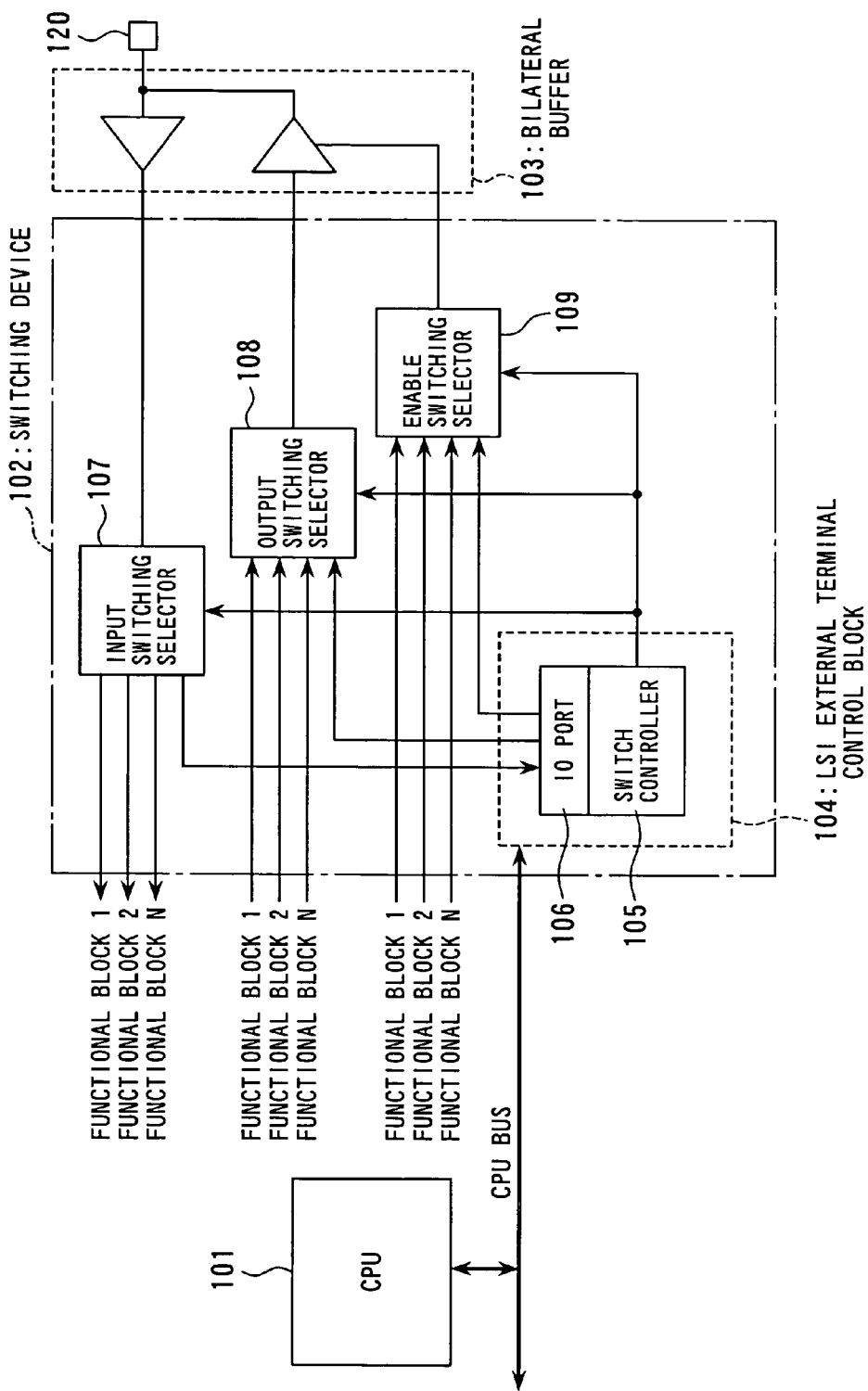
FIG. 1 is a block diagram showing an example of construction of a prior-art multifunctional LSI apparatus.
Figure 6:
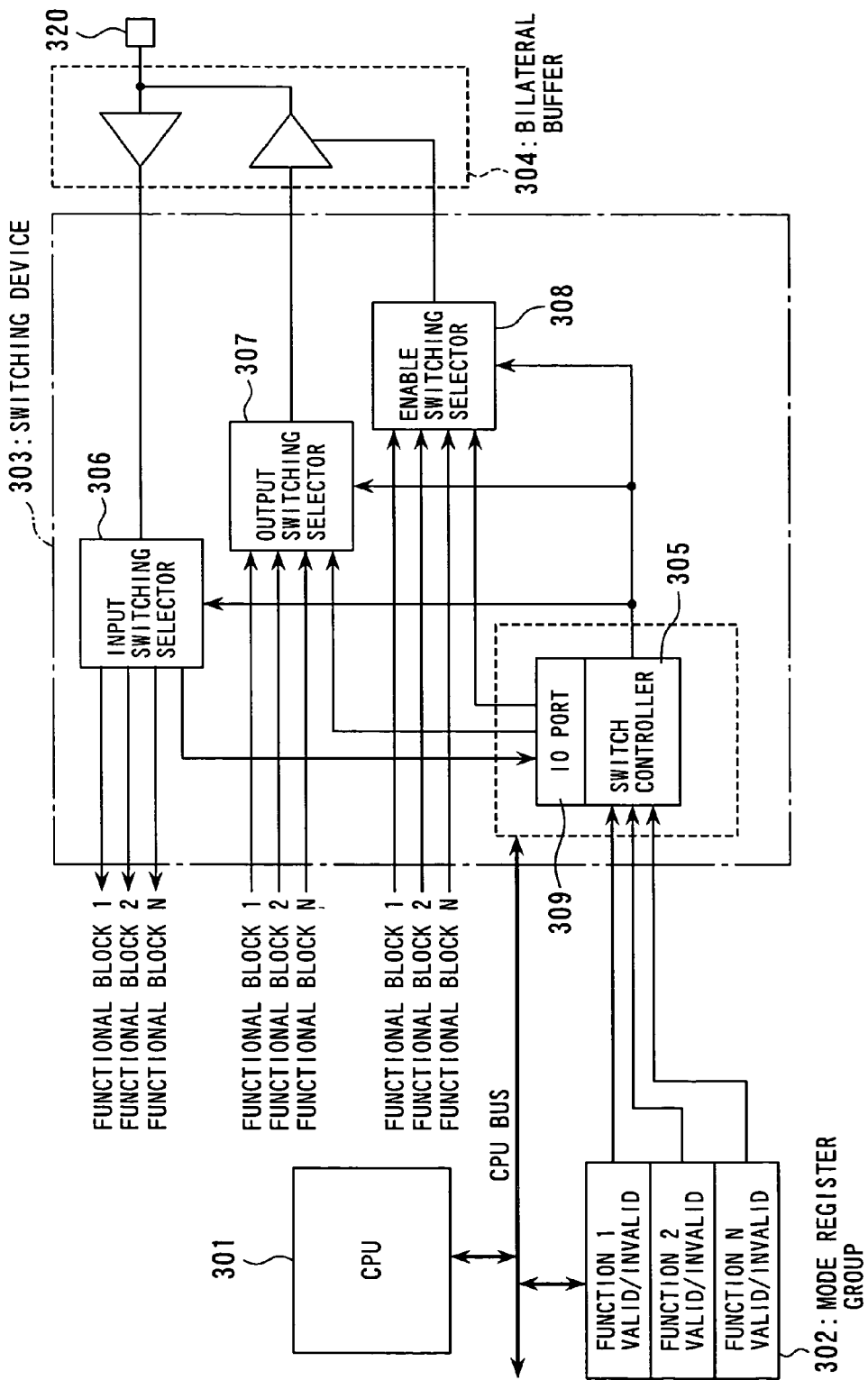
FIG. 6 is a block diagram showing a second embodiment of the invention.

FIG. 6 is a block diagram showing the construction of multifunctional LSI apparatus according to a second embodiment of the invention. In FIG. 6, the circuit construction except the addition of IO port 309 is similar to the construction of the first embodiment shown in FIG. 1. Each component however is denoted by a number in the 300s.

The IO port 309 is to read input signal values via the input/output buffer 304 and control the outputting of output signal values between CPU 301 and the LSI external terminal 320 (control of data communication), and also to effect the switching of enabling signal of the input/output buffer 304.

The switching of the IO port 309 to other functional blocks 1, 2, . . . N is effected in a similar manner as the first embodiment by setting validity/invalidity of IO port 309 to a separate mode register. This mode register itself however is associated with each LSI external terminal 320 and thus is not to be switched block by block. It is provided within the IO port 309 separately from the mode register group 302. The priority sequence of switching is determined also similarly to the first embodiment. For example, the arrangement may be, in a descending order, the IO port function, functional block 1, functional block 2, . . . functional block N.

The switch controller 305 executes control of the input/output buffer 304 by looking up the setting of the mode register group 302, the priority sequence of each functional block, and in addition the setting of the mode register within IO port 309. By providing such IO port function, control of the LSI external terminal 320 by a software becomes possible. For example, it can be used in the so-called boundary scan which makes it readily possible to check the connection between LSI on a substrate and other devices (such as SDRAM, ROM).

Third Embodiment

Figure 7:
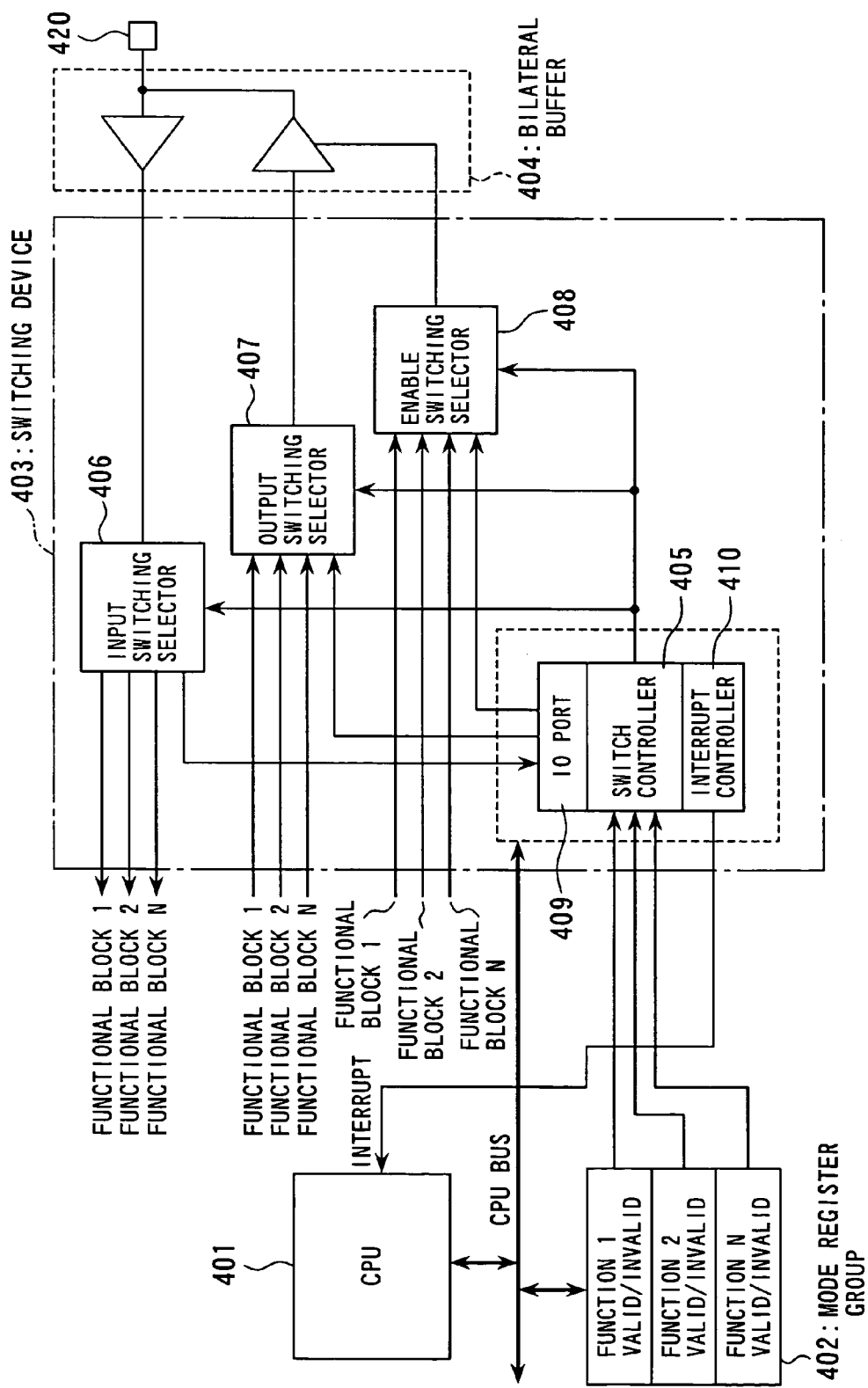
FIG. 7 is a block diagram showing a third embodiment of the invention.

FIG. 7 is a block diagram showing the construction of multifunctional LSI apparatus according to a third embodiment of the invention. In FIG. 7, the circuit construction except the addition of an interrupt controller 410 is similar to the construction of the second embodiment shown in FIG. 6. Each component however is denoted by a number in the 400s.

The interrupt controller 410 is associated with the function of IO port 409 and has a function for detecting a level change in the input value of LSI external terminal 420 and for notifing an interrupt as a result of such detection. Further the method of detecting the level change in the input value can be selected from a detection of leading edge of the input signal, detection of trailing edge, "High" level detection or "Low" level detection.

When CPU 401 in the prior art technique is to detect change in the input signal value of LSI external terminal 420, the input signal value is continuously read by a monitor function within the IO port 409. In this embodiment, on the other hand, the interrupt controller 405 detects such change and notifies CPU 401 of the change by an interrupt so that CPU 401 becomes capable of effecting other control for a period until a notification of change in the input signal value.

Fourth Embodiment

Figure 8:
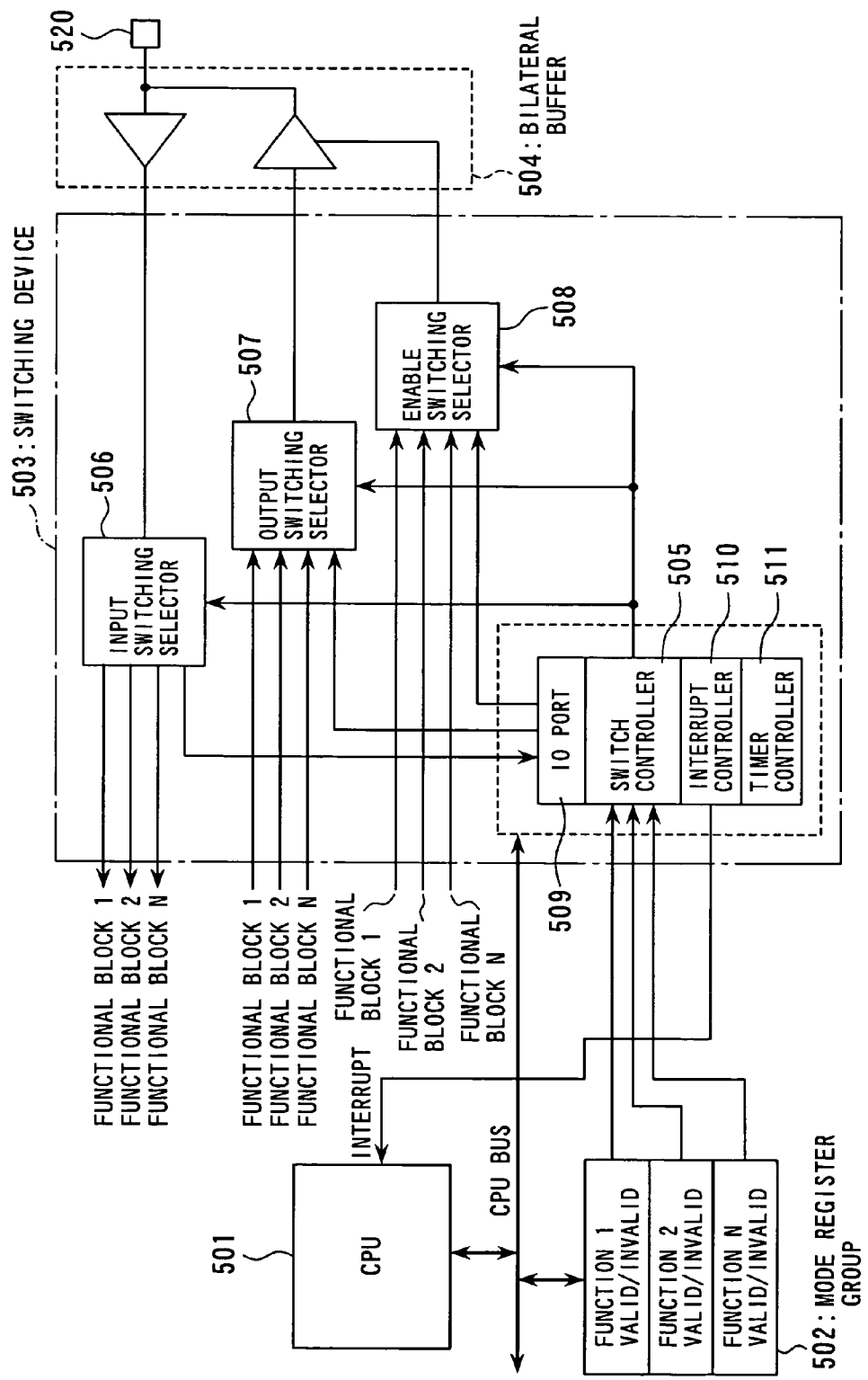
FIG. 8 is a block diagram showing a fourth embodiment of the invention.

FIG. 8 is a block diagram showing the construction of multifunctional LSI apparatus according to a fourth embodiment of the invention. In FIG. 8, the circuit construction except the addition of a timer controller 511 is similar to the construction of the third embodiment shown in FIG. 7. Each component however is denoted by a number in the 500s.

The time setting, start, and stop of the timer controller 511 are set by CPU 501. It has the so-called general-purpose timer function for notifying CPU 501 of an interrupt due to an exceeding of time when a set time has elapsed after its start. The above described time setting of the timer controller 511 is effected by CPU 501 as the time until change of the change in the input signal to be detected at the interrupt controller 510. It is thus so constructed that, if a change in the input signal occurs within the set time, a detection interrupt is caused and the timer is automatically stopped. By contrast, if a change in the input signal value does not occur within the set time, CPU 501 is notified of an overtime interrupt via an interrupt controller 510.

Figure 9:
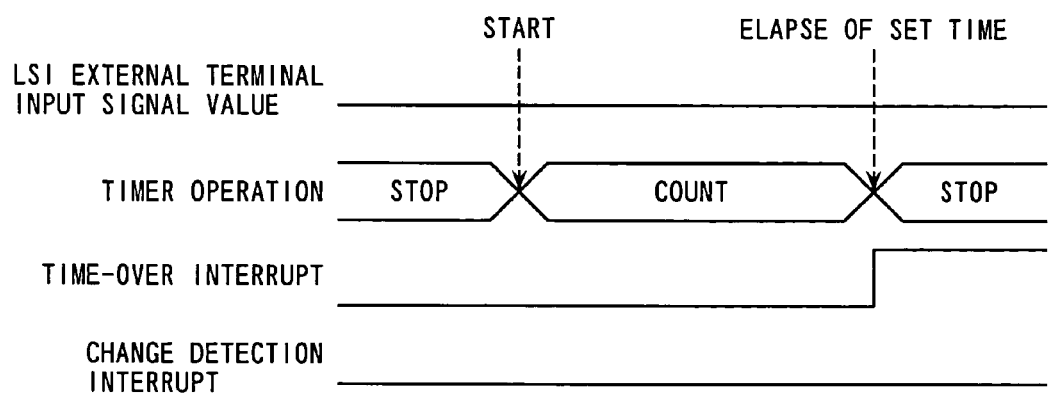
FIG. 9 is a timing chart showing a timer controller operation in the case where an input signal value has not changed in the fourth embodiment shown in FIG. 8.
Figure 10:
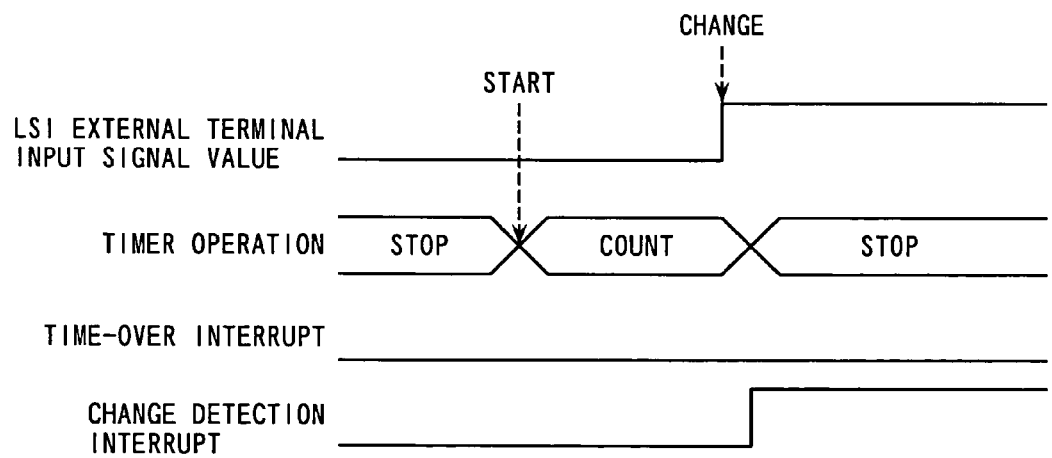
FIG. 10 is a timing chart showing a timer controller operation in the case where an input signal value has changed in the fourth embodiment shown in FIG. 8.

FIGS. 9 and 10 each are a timing chart for showing the operation of the above described timer controller 511 in a simple manner. FIG. 9 is an operation timing chart in the case where no change occurs in the input signal value of LSI external terminal 520; and FIG. 10 is an operation timing chart in the case where a change occurs. It should be noted that the detecting method of input signal value in this case is a leading edge detection.

When change in the input signal value is to be detected by CPU 501, it is possible with the present invention to control operation of CPU 501 after the detection and at the same time operation control in the case of no detection can be defined.

Figure 11:
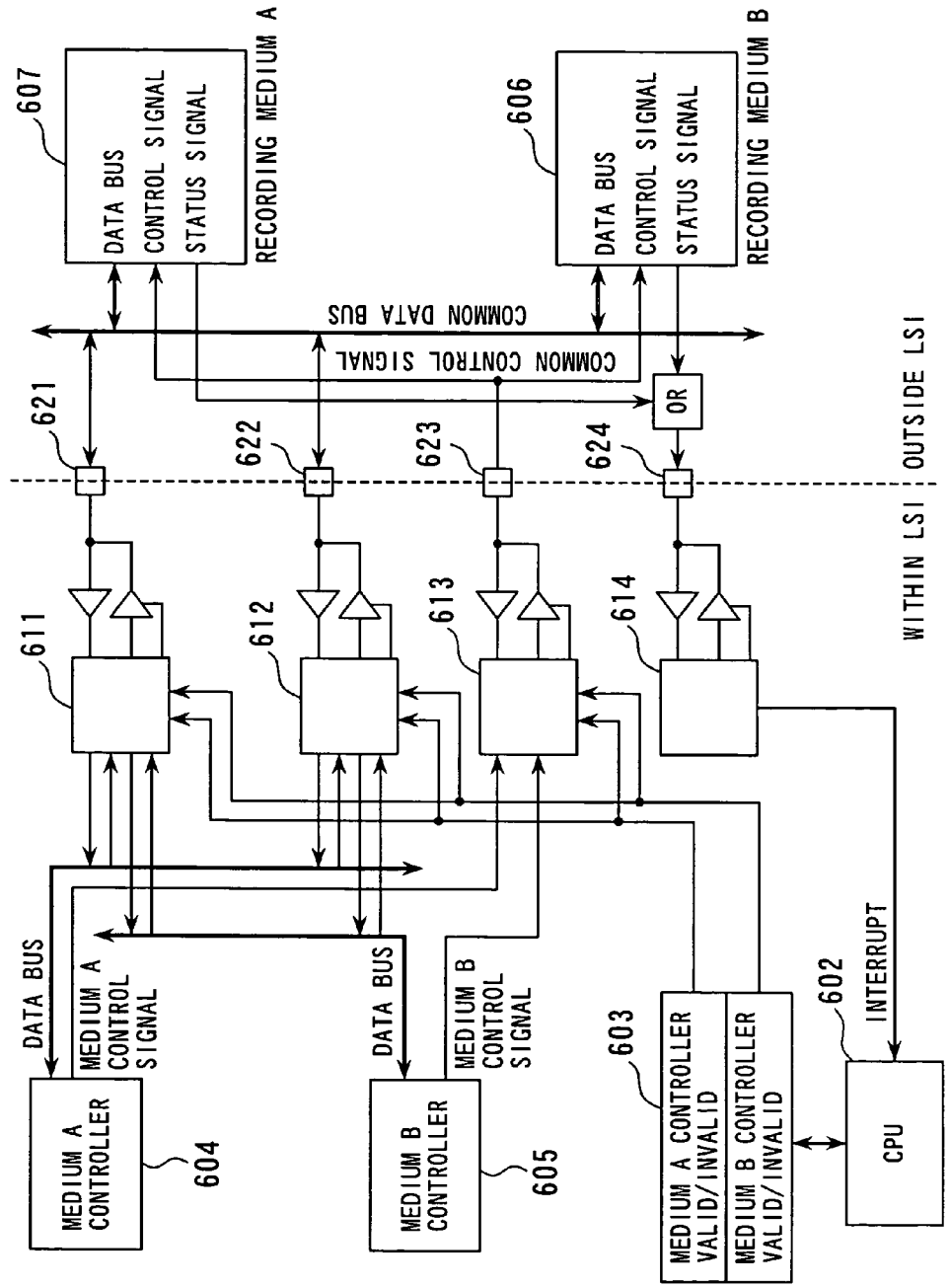
FIG. 11 is a block diagram showing an example of the construction where the invention is applied to a system in which data bus, control signals, and status signals are commonly shared among recording medium A, recording medium B and the controllers thereof.

A description will now be given with respect to a system using the multifunctional LSI apparatus according to the fourth embodiment shown in FIG. 8. FIG. 11 shows a system where data bus for a controller 604 for controlling a recording medium A 607 and a controller 605 for controlling a recording medium B 606, read and write control signals and status signals are commonly shared. Circuits 611 to 614 each correspond to the switching device 503 in the multifunctional LSI apparatus shown in FIG. 8. The circuit 614, however, has a control function for transmitting an interrupt signal upon receiving a status signal. It should be noted that, in FIG. 11, numerals 621 to 624 each denote an LSI external terminal.

By setting from CPU 602 the validity/invalidity of the medium A controller 604 and validity/invalidity of medium B controller 605 to the mode register group 603, the switching between the signal of medium A controller 604 and the signal of medium B controller 605 is effected by the circuits 611 to 613. Supposing now that the priority level of medium A controller 604 is higher than that of medium B controller 605, a description will be given below of a case where data communication is to be effected in the order of that between the recording medium B 606 and medium B controller 605, that between the recording medium A 607 and medium A controller 604, and that between the recording medium B 606 and medium B controller 605. First, CPU 602 sets the medium B mode as valid to the mode register group 603 to effect communication between the recording medium B 606 and the medium B controller 605 through the circuits 611, 612 and 613.

Next, when the communication between the recording medium A 607 and the medium A controller 604 is to be effected, since the medium A controller 604 has a higher priority level, CPU 602 sets the setting of the mode register group 603 for the medium A controller 604 as valid while maintaining the setting of the mode register 603 for the medium B controller 605 as valid. When the communication between the recording medium B 606 and medium B controller 605 is to be effected at last, then, CPU 602 sets the mode register group 603 for the medium A controller 604 as invalid. In other words, if it is desired to alternately switch between the medium A controller 604 and the medium B controller 605 to communicate respectively with the recording medium A 607 and recording medium B 606, the switching can be effected simply such that, while the mode register group 603 for both the medium A controller 604 and the medium B controller 605 are previously set as valid, CPU 602 sets the mode register group 603 for the medium A controller 604 having the higher priority level over again as valid/invalid.

Further, there are types of recording media [for example: SmartMedia (registered trademark), CompactFlash (registered trademark)] that are provided with status signals for indicating enabling/disabling of the next write (or read) operation from the respective medium controllers 604, 605. Since the status signals have different timings according to the manufacturer of the recording media, such status signal is connected to the circuit 614 having IO port function so that change from "disabling" to "enabling" of the status signal is detected to notify CPU 602 of an interrupt. CPU 602, after detecting such interrupt due to change in status signal, becomes possible to effect the next processing. In other words, the time from a write (or read) instruction of CPU 602 for each medium controller 604 and 605 to the next write (or read) instruction can be reduced.

As has been described by way of the above embodiments, with the LSI apparatus according to the first aspect of the invention, a selector for switching the connection between each functional block and external terminal is controlled based on a priority sequence among each functional block retained at a switch controller and flag information set at a mode register so that switching of the LSI external terminal with taking each functional block as a unit becomes possible so as to make it possible to reduce the amount of switch setting program of CPU to reduce load on the CPU.

With the LSI apparatus according to the second aspect, control of data communication or monitoring of input values between CPU and the external terminal is effected by an IO means, and a switch controller is caused to retain a priority sequence among the IO means and each functional block so that the connection between the IO means and the external terminal is effected by the switch controller in accordance with the priority sequence. It thereby becomes possible to practically use the external terminal as an IO port.

With the LSI apparatus according to the third aspect, a change interrupt notification means interrupts and notifies CPU of change in an input value of external terminal detected at an IO means, for example change in the input value from "0" to "1" or from "1" to "0". It thereby becomes possible for CPU to execute other control for a time period until a notification of change in input signal so that a restrained time of CPU can be reduced.

With the LSI apparatus according to the fourth aspect, CPU is notified of an interrupt by a timer interrupt notification means provided at an IO means when a change in input value of the external terminal does not occur before an elapse of set predetermined time. It is thereby possible to be resolute as to whether there is a change in input signal value or not so as to set an action of CPU in the case without change. Accordingly, it is possible to reduce a waste of time in detecting a change in input value at the external terminal.

What is claimed is:

1. An LSI (large scale integrated circuit) apparatus comprising a CPU and a plurality of functional blocks for controlling an external equipment, the plurality of functional blocks sharing one external terminal connected to the external equipment, said LSI apparatus comprising:

a mode register having flag information set by the CPU indicating validity or invalidity of each functional block;

a selector for switching the connection between each functional block and the external terminal; and a switch controller retaining a priority sequence among each functional block, for controlling switching of the selector based on the priority sequence and the flag information set at the mode register, wherein the plurality of functional blocks are indicated as being valid at the same time.

2. The LSI apparatus according to claim 1 further comprising an IO means for effecting data communication between said CPU and said external terminal, said switch controller retaining said priority sequence among each functional block inclusive of the IO means.

3. The LSI apparatus according to claim 2, wherein said IO means comprises a change interrupt notification means for detecting a change in input value of said external terminal to notify said CPU of an interrupt.

4. The LSI apparatus according to claim 2, wherein said IO means comprises a timer interrupt notification means for notifying said CPU of an interrupt when an input value of said external terminal does not change before an elapse of set predetermined time.

* * * * *